United States Patent [19]

Hartmann

[11] Patent Number: 4,961,368

[45] Date of Patent: Oct. 9, 1990

[54] ANCHORING ELEMENT

[75] Inventor: Rudolf Hartmann, Karlsbad, Fed. Rep. of Germany

[73] Assignee: IBP Pietzsch GmbH, Ettlingen, Fed. Rep. of Germany

[21] Appl. No.: 128,820

[22] Filed: Dec. 4, 1987

[30] Foreign Application Priority Data

Dec. 12, 1986 [DE] Fed. Rep. of Germany ....... 3642535

[51] Int. Cl.$^5$ ................................. F41H 5/04
[52] U.S. Cl. ...................................... 89/36.02; 109/81
[58] Field of Search .......................... 89/36.02, 36.08; 109/80, 81, 82, 83, 84; 428/911

[56] References Cited

U.S. PATENT DOCUMENTS

| 620,073 | 2/1899 | Holmes | 109/83 |
|---|---|---|---|
| 729,809 | 6/1903 | Kilham | 109/84 |
| 1,879,319 | 9/1932 | Kleitz | 109/80 |
| 3,382,821 | 5/1968 | Dundr | 109/82 |
| 4,036,104 | 7/1977 | Pagano et al. | 109/82 |
| 4,662,288 | 5/1987 | Hastings et al. | 428/911 |

FOREIGN PATENT DOCUMENTS

| 68004 | 7/1913 | Austria | 109/82 |
|---|---|---|---|
| 133956 | 8/1900 | Fed. Rep. of Germany | . |
| 534357 | 1/1928 | Fed. Rep. of Germany | 109/80 |
| 3410962 | 3/1984 | Fed. Rep. of Germany | . |
| 3518779 | 5/1985 | Fed. Rep. of Germany | 89/36.02 |

Primary Examiner—Charles T. Jordan
Assistant Examiner—Stephen Johnson
Attorney, Agent, or Firm—Klein & Vibber

[57] ABSTRACT

An anchoring element for the securing of heavy plates or the like on an anchoring base, particularly for securing armoring elements or additional armoring to vehicles, includes a plate-shaped buffer body of a material that is elastically deformable to a limited extent, such as of rubber or a similar material, and two connecting elements which are rigidly connected with the buffer body and are held by the buffer body at a predetermined distance from one another. Of the connecting elements, which are movable with respect to one another within limits determined by the deformability of the buffer body, one is connectable with the plate to be mounted and the other with the anchoring base. Each of the connecting elements includes a floor metal sheet plate which has a thickness which is very small relative to its other dimensions. The floor metal sheet plates accommodate the buffer body between themselves and are connected with the latter over relatively large areas at the respective contact planes. The connecting elements further include respective holding metal elements that are connectable to the plate to be mounted and to the anchoring base, respectively. The floor metal plates and the holding metal sheet elements are provided with respective cooperating rapid-action coupling formations.

5 Claims, 5 Drawing Sheets

ANCHORING ELEMENT

BACKGROUND OF THE INVENTION

The present invention relates to anchoring elements in general, and more particularly to an anchoring element which is especially suited for the mounting and support of relatively heavy plates on an anchoring base and particularly for the securing of armoring elements or additional armoring to vehicles.

There are already known various constructions of anchoring elements of the above type for use in securing armoring elements or additional armoring to vehicles, among them such including a buffer body of a material that is elastically deformable to a limited extent, such as rubber or any other material having similar resilient and damping properties. This known anchoring element construction further includes two connecting elements rigidly connected with the buffer body and held by the buffer body at a predetermined distance from one another. The connecting elements are movable with respect to one another within limits determined by the deformability of the buffer element, and one of them is connectable to the respective plate to be mounted and the other to the anchoring base.

Anchoring elements of this kind serve the purpose of connecting armoring elements or additional armoring with an anchoring base, for instance with a vehicle to be protected, in such a resilient and damped manner that shot pulses or impacts which act on the armoring elements from the outside and which have magnitudes and directions that are not predictable, are considerably built down.

The heretofore known anchoring element of the type briefly described above and which forms a basis of the present invention is a rubber element with a buffer body that is configured in a rotationally symmetrical manner. A threaded sleeve serving as a connecting element extends into the buffer body from one of the end faces of the latter and is connected with the buffer body by being vulcanized thereto, while the other end is firmly clamped in a second connecting element. During the use of this arrangement in accordance with specifications, the last-mentioned second connecting element with the clamped end of the buffer body is rigidly connected with parts of the vehicle to be protected, and the buffer body extends between the aforementioned parts of the vehicle and an armoring element or the like which abuts against the end face of the buffer body that is remote from the clamped end portion. Then, a fastening screw penetrates through the armoring element into the vulcanizedly connected threaded sleeve and holds the armoring element in position.

What appears to be unsatisfactory in connection with this particular construction of the anchoring element is that, in view of the clamping of the rotationally symmetrical buffer body at one of its end portions in the connecting element which serves as an intermediary for the connection to the vehicle parts, and in view of the provision of the threaded sleeve for the accommodation of the fastening screw, which sleeve extends from the other end face into the buffer body, despite the necessarily considerable axial dimension of the buffer body, only a very limited volume of the buffer body determines its resilient and damping properties. On the other hand, the clamped parts of the buffer body, due to the incompressibility of the buffer material, do not contribute anything, and the parts of the buffer body which surround the vulcanized-in threaded sleeve, make only a very insignificant contribution, to the accomplished resilient and damping action.

Moreover, and possibly even more importantly, the relatively large axial dimension of the buffer body and thus of the entire anchoring element results in relatively huge distances between the connection points of the vehicle or of another anchoring base, and the armoring elements or additional armoring which are to be mounted on such an anchoring base. This, in turn, results in a severely undesirably large silhouette of the armored vehicle which is equipped with its armoring elements by using the buffer bodies of the above-discussed kind.

SUMMARY OF THE INVENTION

Accordingly, it is a general object of the present invention provide an anchoring element which avoids the disadvantages of the prior art.

More particularly, it is an object of the present invention to provide an anchoring element which does not possess the drawbacks of the known elements of this type.

Still another object of the present invention is to devise an anchoring element of the type here under consideration which is particularly suited for use in mounting armoring elements or additional armoring or other relatively heavy plates on vehicles and other anchoring bases.

It is yet another object of the present invention to design the above anchoring element in such a manner as to render it possible to mount the armoring elements or the like at a much smaller distance from the anchoring base than was heretofore possible, without reducing the resilient and damping properties of the anchoring element.

A concomitant object of the present invention is to construct the anchoring element of the above type in such a way as to be relatively simple in construction, inexpensive to manufacture, easy to use, and yet reliable in operation.

In keeping with these objects and others which will become apparent hereafter, one feature of the present invention resides in an anchoring element for the securing of heavy plates or the like on an anchoring base, particularly for securing armoring elements or additional armoring to vehicles. This anchoring element of the present invention includes a buffer body of a material that is elastically deformable to a limited extent. The buffer body has a plate-shaped configuration. The anchoring element further includes two connecting elements which are rigidly connected with the buffer body and are held by the buffer body at a predetermined distance from one another so as to be movable with respect to one another within limits determined by the deformability of the buffer element. Each of the connecting elements includes a floor metal sheet plate having a thickness which is very small relative to its other dimensions. The floor metal sheet plates accommodate the buffer body between themselves and are connected with the latter over relatively large areas at the respective contact planes. There is further provided means for securing one of the connecting elements to the respective plate and the other to the anchoring base.

A particularly advantageous characteristic of the arrangement of the present invention as described so far is, among others, that any clamping of parts of the buffer body is meticulously avoided, and that the plate-shaped buffer body that is received between the floor metal sheet plates acts in its entirety as a resilient and damping element.

Consequently, there is obtained, in conjunction with the floor sheet metal elements of a small thickness, a compactly configured and constructed anchoring element, the dimensions of which as measured between the outer surfaces of the floor sheet metal plates are relatively small. In this manner, it is possible to succeed in mounting the armoring plates or other armoring elements, for instance on an armored vehicle or even as additional armoring on guns or the like, at an extremely small distance from the anchoring surfaces. When this approach is taken in mounting vehicle armoring, it results in a highly desirable reduction of the outer dimensions of such vehicles and, by the same token, in a very small silhouette which is highly desirable especially in armored vehicles.

An advantageous further development of the present invention resides in the fact that at least one of the buffer body and the floor metal sheet plates of the connecting elements has at least one aperture for improving the elastic yieldability of the buffer body due to penetration of the material of the buffer body into the free space of the aperture.

As a result of the provision and dimensions of such a free space, or of a plurality of such free spaces, for the accommodation of the buffer material which is displaced during the deformation of the buffer body, it is possible to adjust the resilient strength and the damping properties of the buffer body and thus of the entire anchoring element. In this connection, it is particularly advantageous when the aperture of the buffer body is situated at the region of the contact planes in at least one of the floor metal sheet plates.

Another important feature of the present invention provides for the buffer body to have at least one aperture which penetrates the buffer body at a distance from the floor metal sheet plates, and for the provision of at least one plug of a material having a hardness differing from that of the material of the buffer body, the plug being received in the aperture. Even this measure results in an extremely desirable adjustment of the resilient and damping properties of the buffer body, for example, to achieve adjustment to different operating temperatures.

An embodiment of the present invention, which is particularly advantageous for the currently preferred intended use of the anchoring element of the present invention for the mounting of armoring elements or additional armoring on vehicles or the like, includes holding means embedded in the buffer body and rigidly alternatingly connected with the metal sheet plates of the connecting elements. Such holding includes holding elements that extend behind one another a predetermined play and permit elastic deformation of the body within predetermined limits.

One reason for this measure is to prevent falling off of the armoring elements or additional from the respective anchoring base to which it is connected by the anchoring elements of the present invention in the event of destruction of the buffer body which can only withstand temperatures up to a predetermined limit, in that the holding elements of the holding means which positively engage one another then become effective.

A further development of this important aspect of the present invention provides for the holding means to include at least one bow-shaped eyelet member for each of the floor metal sheet plates and weldedly connected thereto, the eyelet members being embedded in the buffer body, preferably by being vulcanized therein and embracing one another with the predetermined play of such a magnitude that a deformation of the buffer body can take place within predetermined limits in response to an external pulse influence on the armoring element or the like.

Another development of this aspect of the invention resides in the fact that the holding means includes at least one chain embedded in the buffer body and a plurality of chain links which have play with respect to one another, and end portions that are spaced from one another and each one of which is rigidly connected with a different one of the floor metal sheet plates of the connecting elements.

Even in this development of the basic construction of the anchoring element of the present invention, the holding means becomes effective only after a possible destruction of the buffer body, in that the chain links, which in their embedded positions within the buffer body do not adversely affect the deformability of the buffer body in the predetermined limits, reach their positions in which they positively engage one another, so that they are prevented from falling off of the armoring element which is mounted by means of such anchoring elements.

Still another embodiment of the anchoring element of the present invention provides for the floor metal sheet plates to have respective openings, and for the holding means to include at least one flexible rope of a high-strength material, such as Kevlar, which extends along a spiral-shaped course and through the openings and is rigidly connected with the floor metal sheet plates by being secured thereto directly as well as by being embedded in the buffer body.

In this further development of the anchoring element of the present invention, the anchored armoring elements, plates or the like are still positively and firmly held in position in the event of destruction of the buffer body.

The same effect is also achieved when, in accordance with a further facet of the present invention, the holding means which positively engages one another with a predetermined play includes at least one holding cage rigidly connected with one of the floor metal sheet plates, embedded in the buffer body, and having at least one opening, and at least one pin rigidly connected with the other of the floor metal sheet plates and including a stem passing through the opening of the holding cage and having a free end portion and a disk mounted on the free end portion of the stem and positively engaging the holding cage from behind at a side thereof which faces away from the other floor sheet metal element. In this context, it has been established to be particularly advantageous when the opening provided in the holding cage that is rigidly connected with the one floor metal sheet plate has an elongated either slot-shaped or oval configuration. The disk that is mounted on the free end portion of the stem of the pin is then rigidly connected with the other floor metal sheet plate and has an elongated hammerhead-shaped configuration, and the longitudinal dimension of the disk then extends at an angle of approximately 90° relative to the longitudinal dimension of the opening of the holding cage.

According to a further important embodiment of the anchoring element of the present invention, an unproblematical mounting and dismounting of the anchoring elements or the like by means of the anchoring elements of the present invention is accomplished in such a manner that the connecting elements include respective floor metal sheet plates that are rigidly connected with the buffer body, and respective holding sheet metal elements which are connectable to the anchoring base, on the one hand, and to the plate to be supported thereon, on the other hand, and that there is further provided rapid-action coupling means mounted on the floor metal sheet plates and on the holding metal sheet elements and operative for establishing a relatively rigid, yet selectively releasable, connection.

It has been established that it is particularly advantageous in the anchoring element embodying this concept of the present invention when the rapid-action coupling means for the establishment of the relatively rigid, yet selectively releasable, connection includes respective guiding surfaces situated at two mutually oppositely situated longitudinal edge portions of the floor metal sheet plates, and guiding sections of the holding sheet metal elements which receive the guiding surfaces between themselves and positively engage behind at least respective regions of the longitudinal edge portions, and when the floor metal sheet plates are insertable from one side between the guiding sections of the holding sheet metal elements.

Such an embodiment of the rapid-action coupling means is characterized not only by a particularly simple construction and simple handling and maneuverability, but also, especially, by the fact that the relatively flat configuration of the anchoring element, which is desired in the interest of achieving of only a very small distance between the parts to be and the anchoring base, is not impaired.

When, in accordance with a further enhanced feature of the arrangement of the present invention, the guiding surfaces of the floor metal sheet plates and respective corresponding guiding sections of the holding sheet metal elements are configured in the manner of respective dovetail guides, there is also achieved an accurate reception of the floor metal sheet plates between the guiding sections of the holding sheet metal elements that are connected, on the one hand, with the anchoring base and, on the other hand, with the structural component to be anchored, while simultaneously assuring a positive and rigid connection of the affected parts with one another.

In order to assure or obtain a secure proper and reliable seating of the floor sheet metal plates in their inserted position between the guiding sections of the holding sheet metal elements, there may be provided positively effective anchoring means. In contradistinction thereto, a yet further development of the arrangement of the present invention provides for the holding sheet metal elements to include respective guiding sections which extend, as considered in plan view thereof, in a diverging manner relative to one another toward an insertion side for the floor metal sheet plates at an opening angle which promotes self-retention, whereas the guiding surfaces of the floor metal sheet plates that correspond thereto have a fitting wedge-shaped configuration.

When the floor metal sheet plates are inserted in an anchoring arrangement provided with such a further development of the present invention, from the insertion side, between the guiding sections of the holding sheet metal elements that extend along paths which diverge at a predetermined angle from one another in the direction toward the insertion side, and are brought into their final mounted position by applying a slight force in the insertion direction thereto, there is obtained, as a result of self-retention at the regions of the guiding surfaces that correspond to or are associated with one another, to a certain degree or in a certain sense, anchoring of the floor metal sheet plates between the holding sheet metal elements.

While the rapid-action coupling means constructed in accordance with the above-discussed further developments of this aspect of the basic concept of the present invention is loadable predominantly transversely with respect to the insertion direction, an omnidirectional or all-directional loadability of the anchoring element can be achieved if, in accordance with a further feature of the present invention, the floor metal sheet plates which are rigidly connected with the buffer body and the holding metal sheet elements that are connectable to the anchoring base, on the one hand, and to the plate to be supported thereon, on the other hand, are configured as respective disks, and if the rapid-action coupling means for establishing the rigid yet selectively releasable connection includes arresting contours on the disks that embrace one another and positively engage behind each other in an assembled condition thereof.

Herein, the arresting contours of the floor metal sheet plates and of the holding metal sheet elements may advantageously include respective radial projections which are distributed over the peripheries of the disks and which can be brought into and out of an arresting position in which they positively engage behind one another by turning the anchoring element. The radial projections of the floor metal sheet plates and/or of the holding metal sheet elements may have tightening cam surfaces which extend along spiral-shaped courses, or tightening cam surfaces which extend along eccentric courses, such tightening surfaces cooperating with one another in a coupling position thereof in a positive manner and with clamping action.

Alternatively, the arresting contours may include externally threaded portions on the floor metal sheet plates and corresponding internally threaded portions of the holding metal sheet elements as respective arresting contours. Then, the externally threaded portion of one of the floor metal sheet plates and the internally threaded portion of the associated one of the holding metal sheet elements advantageously have the same pitch as, but in an opposite sense, than those of the other floor metal sheet plate and other holding metal sheet element, so that it is possible to achieve simultaneous threading of the two floor sheet metal plates into the corresponding thread of the two holding sheet metal elements which, when the arrangement is properly utilized in the above-described manner, are rigidly connected with the anchoring base, on the one hand, and with the plates to be anchored, on the other hand.

In the embodiments of the anchoring elements in accordance with the present invention in which the rapid-action coupling means is constructed as arresting contours which can be brought into and out of their coupling positions by turning the anchoring elements about their axis that extend substantially perpendicularly to the major dimensions of the major dimensions of the floor metal sheet plates, it is advantageous when there are further provided adjustment plates which are connected with and project radially outwardly beyond the floor metal sheet plates to serve for the engagement of suitable actuating tools therewith. These adjustment plates serve for rapid and simple mounting or dismounting of the anchoring elements.

BRIEF DESCRIPTION OF THE DRAWING

The present invention will be described below in more detail with reference to the accompanying drawing in which.

DETAILED DESCRIPTION OF THE EMBODIMENT

Figure 1:
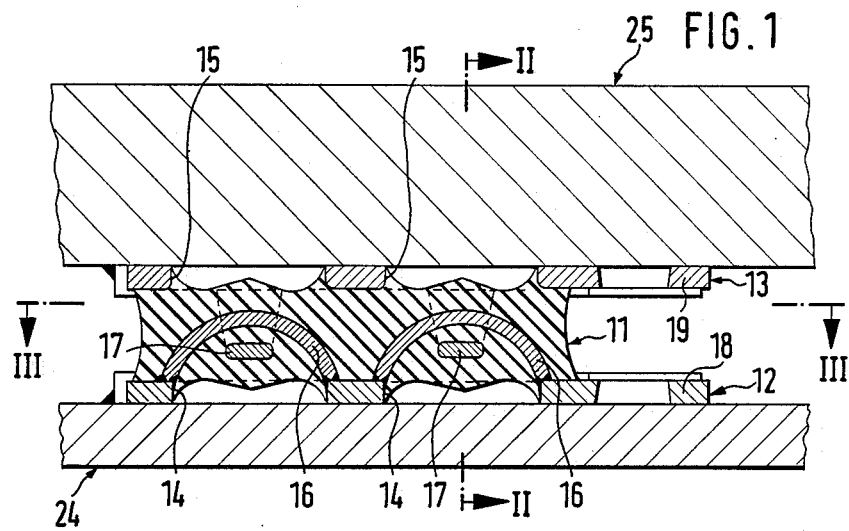
FIG. 1 is a longitudinal sectional view taken on line I—I of FIG. 3 of an anchoring arrangement including an anchoring element of the present invention, as used for connecting an armoring element with the tub of an armored vehicle.
Figure 3:
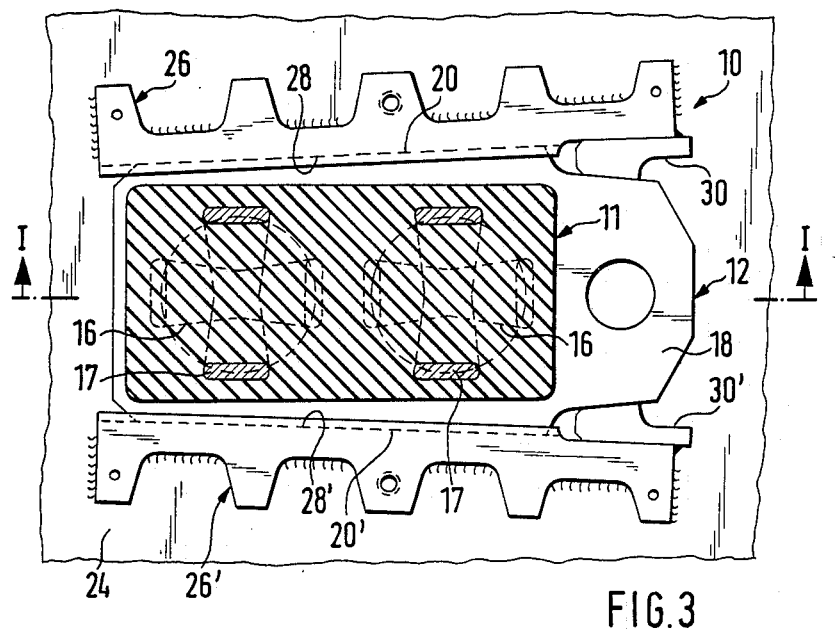
FIG. 3 is a sectional view of the anchoring element of the arrangement of FIG. 1 taken on line III—III of FIG. 1.
Figure 2:
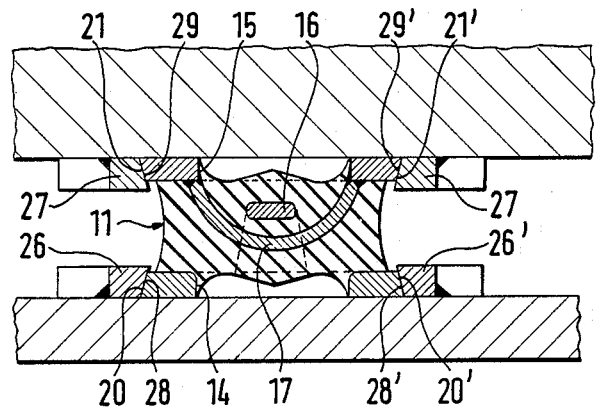
FIG. 2 is a cross-sectional view of the anchoring arrangement of FIG. 1 taken on line II—II of FIG. 1.

Referring now to the drawing in detail, and first to FIGS. 1 to 3 thereof, it may be seen that the reference numeral 10 has been used therein to identify an anchoring element constructed in accordance with the present invention. The anchoring element 10 includes a substantially plate-shaped buffer body 11 of rubber or of another material having comparable resilient and damping properties. The buffer body 11 is received between two floor metal sheet plates 12 and 13 that extend along mutually parallel planes, and is connected with these metal sheet plates 12 and 13 over relatively large areas by gluing or vulcanization. Each of the metal sheet plates 12 and 13 is provided with two circular apertures 14 and 15 which are arranged substantially symmetrically with respect to the major surfaces of the buffer body 11 and extend through the respective metal sheet plates 12 and 13, so that free spaces are formed at the regions of these apertures 14 and 15, into which the material of the buffer body 11 can yield or be displaced during a deformation of the buffer body as it may occur, for instance, when the floor metal sheet plates 12 and 13 are pressed toward one another or shifted relative to each other.

Two semicircular bow elements 16 or 17 are connected by welding with each of the floor metal sheet plates 12 and 13 at the regions of the edges of the apertures 14 and 15 that extend through the floor metal sheet plates 12 and 13. The bow elements 16 which are weldedly connected with one of floor metal sheet plates 12 are aligned with one another, whereas the bow elements 17, which are associated with the other of the floor metal sheet plate 13, are welded to the latter in parallel positions relative to each other. Herein, the arrangement is selected in such a manner that the respective one of the bow elements 17 which is weldedly connected with the other of the floor metal sheet plate 13 extends around the associated one of the bow elements 16 which is weldedly connected with the the floor metal sheet plate 12, with a spacing therefrom, and the bow elements 16 and 17 which thus embrace each other positively but with spacing are accommodated within the buffer body 11, for instance embedded in the buffer body 11 during a vulcanization process.

The buffer body 11 is shown in the top plan view of FIG. 3 and is configured as a rectangular plate. There extend respective holes at the region of one of the end faces, respective flange-like sections 18 and 19 of the floor metal sheet plates 12 and 13. As may be seen particularly in FIGS. 2 and 3 of the drawing, outer longitudinal edge portions 20 and 20= or 21 and 21= of the floor metal sheet plates 12 and 13 extend along courses which slightly diverge with respect to the flange-like sections 18 and 19 are provided with the aforementioned holes, so as to form a wedge. The flange-like sections are further provided with dovetail-like holding surface portions. The floor sheet plates 12 and 13 form, together with holding metal sheet elements 26 and 26= or 27 and 27= a rigid yet selectively releasable connection of the anchoring elements 10 on the floor frame. The sheet elements 26, 26= and 27, 27= are connected by welding to a vehicle wall 24, which is only schematically indicated in the drawing, of a non-illustrated vehicle, on the one hand, and to the inner sides of an armoring elements 25, on the other hand. The anchoring elements 10 are also connected via the bottom parts for connecting an armoring element 25. Accordingly, the holding metal elements 26 and 26= or 27 and 27= are provided with dovetail-like longitudinal guides 28 and 28= or 29 and 29= which are configured correspondingly to the longitudinal edge portions 20 and 20= or 21 and 21= of the floor metal sheet plates 12 and 13, which also have dovetail-like configurations. These guides 26 and 26= or 27 and 27= are arranged at distances from one another which correspond to the wedge-shaped courses of the outer edge portions 20 and 20= or 21 and 21= of the floor metal sheet plates 12 and 13 and are connected by welding, in the manner which is indicated in the drawing, with the indicated vehicle wall 24 of the vehicle, on the one hand, and with the inner side of the armoring element 25 that is shown in FIGS. 1 and 2 of the drawing.

After an armoring element 25 which is provided with the holding metal elements 27 and 27= has been brought, in a manner the details of which are not of here, for instance by means of a crane, into its predetermined position with respect to a vehicle which is provided with corresponding holding sheet metal elements 26 and 26=, it is possible to accomplish the anchoring of the above-mentioned armoring element 25 in a very simple manner, in that the floor metal sheet plates 12 and 13 that accommodate the buffer body 11 between themselves are introduced or shifted between the wedge-like narrowing guiding sections 28 and 28= or 29 and 29= of the holding metal elements 26 and 26=, and 27 and 27=, respectively, which are mounted on the vehicle frame 24 and on the armoring element 25, respectively, and are wedged therein by application of a modest force. During this assembling operation, there occurs, in view of the selection of the angle of inclination of the holding surfaces that cooperate with one another, self-retention between the holding sheet metal elements 26 and 26=, and 27 and 27=, and the floor metal sheet plates 12 and 13. For the purpose of securing of the armoring element 25 in its desired holding position, there are provided, as indicated in FIG. 3 of the drawing, respective holding bow elements 30 and 30=, which are respectively inserted from above between the respective holding metal elements 26 and 26= or 27 and 27=, and which are held in position by means of respective easily removable point welded joints.

Figure 4:
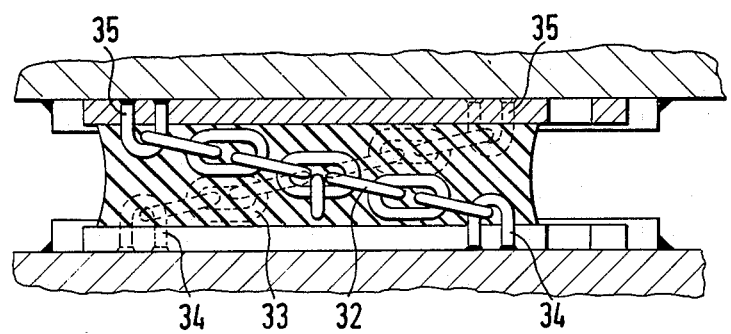
FIG. 4 is a view similar to FIG. 1 but showing a modified construction of the anchoring arrangement.

Turning now to FIG. 4 of the drawing, it may be seen that a modified construction of the arrangement of the present invention as depicted there differs from that illustrated in FIGS. 1 to 3 of the drawing and described above, in principle, only in that, instead of the semicircular bow elements 17 which embrace each other in a positive manner but with spacing from one another and which are connected to the floor plates by respective welded joints, there are embedded in the buffer body 11 respective chains 32 and 33, with respective clearances or play between the individual links of these chains 32 and 33. The respective end links of the chains 32 and 33 are then in a hanging engagement with respective eyelets 34 and 35 that are weldedly connected to the respective ones of the floor metal sheet plates. In view of the mutual play between the individual links of the chains 32 and 33 that are embedded in the buffer body 11, it is possible to achieve deformability of the buffer body 11 within predetermined limits, both due to shifting of the floor metal sheet plates 12 and 13 which receive the buffer body 11 between themselves, as well as in a direction normal thereto.

Figure 5:
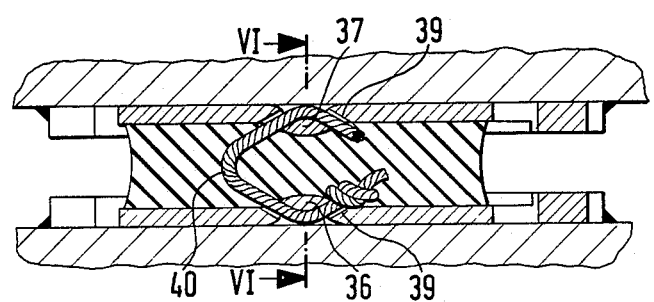
FIG. 5 is a view similar to FIG. 1 but showing another modification of the anchoring arrangement.
Figure 6:
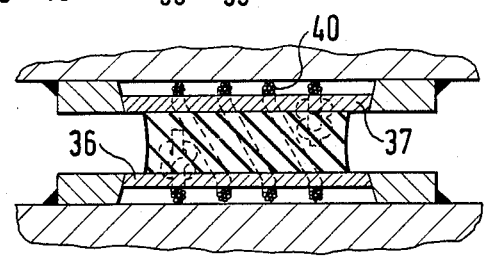
FIG. 6 is a cross-sectional view of the modification of the anchoring arrangement shown in FIG. 5 on line VI—VI of FIG. 5.

In a further modification of the arrangement of the present invention which is depicted in FIGS. 5 and 6 of the drawing, the two floor metal sheet plates 12 and 13 which receive the buffer body 11 between themselves are provided at inwardly bulging regions 36 and 37 that are formed in the buffer body 11 with respective openings 38 and 39. A flexible rope or cable 40 of a material possessing high strength, such as of Kevlar, passes through these openings 38 and 39 and is held in position by knots that are formed at the respective end portions of the flexible rope or cable 40. The rope or cable 40 extends along a spiral-shaped course and is also embedded in the buffer body 11.

Figure 7:
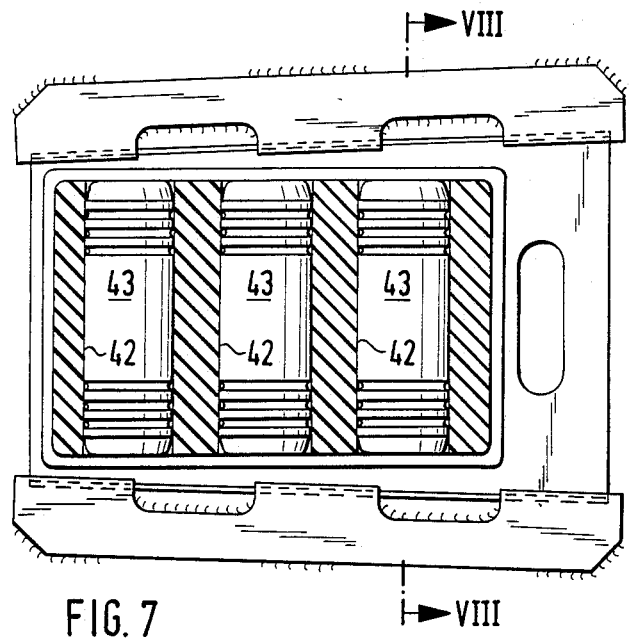
FIG. 7 is a view similar to FIG. 3 but showing an additional modification of the anchoring arrangement.
Figure 8:
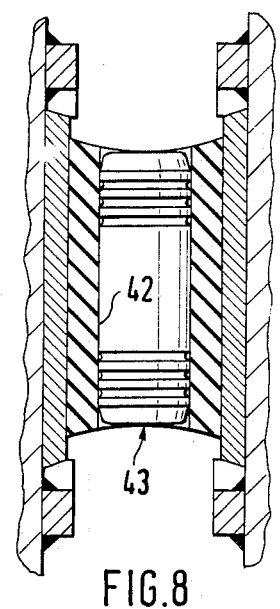
FIG. 8 is a cross-sectional view of the additional modification of the anchoring arrangement depicted in FIG. 7, taken on line VIII—VIII of FIG. 7.

In an additional modified construction of the arrangement of the present invention which is illustrated in FIGS. 7 and 8 of the drawing, three annularly cylindrical apertures 42 extend transversely through the buffer body 11 at a distance from the two floor metal sheet plates 12 and 13. Plugs 41 of a buffer material are inserted into the apertures 42, for instance, glued therein. The rigidity and damping properties of these plugs 41 are different from the corresponding properties of the buffer body 11.

Figure 9:
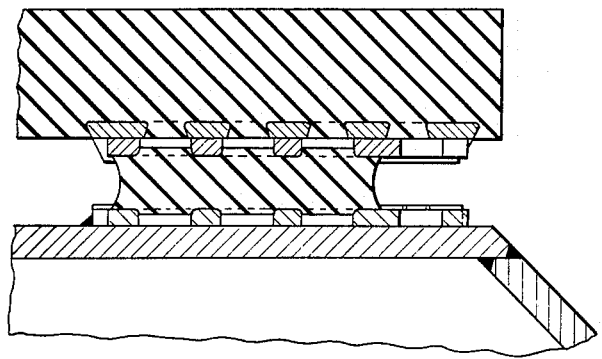
FIG. 9 is another view similar to FIG. 1 but showing a further modified construction of the anchoring arrangement.

In the modified construction of the arrangement of the present invention that is shown in FIG. 9 of the drawing, a connecting component which serves as an intermediary in the connection to an armoring element 25 includes a holding sheet metal element which is embedded in the buffer body 11. Then, the bottom metal sheet plate which confronts the armoring element 25 is introduced in the same manner as discussed above in conjunction with FIGS. 1 to 3 of the drawing between holding surfaces which narrow relative to one another in a wedge-shaped manner and have dovetail-shaped configurations, this bottom metal sheet plate being in this manner connected with the holding metal sheet element.

Figure 10:
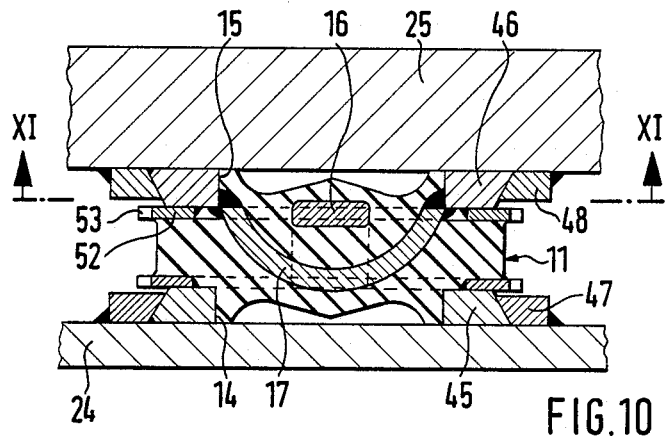
FIG. 10 is a view similar to FIG. 2 but showing a still further modification of the anchoring arrangement.
Figure 11:
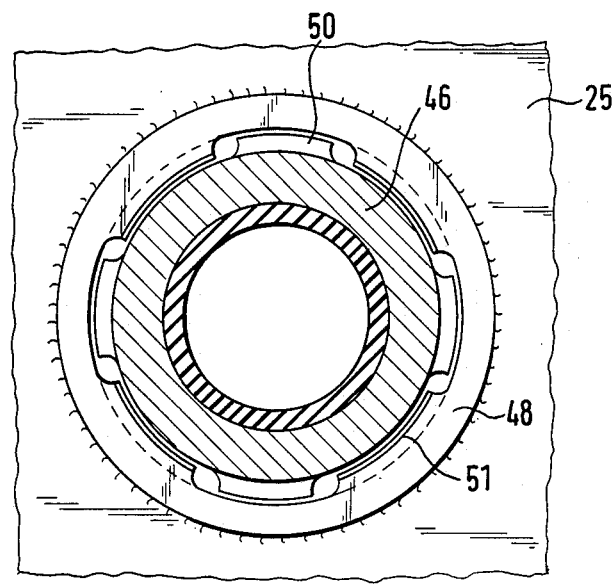
FIG. 11 is a cross-sectional view of the still further modification of the anchoring arrangement illustrated in FIG. 10, taken on line XI—XI of FIG. 10.

The modified construction of the arrangement of the present invention that is shown in FIGS. 10 and 11 of the drawing differs from the constructions that have been described so far in the design of the floor metal sheet plates 45 and 46, which are rigidly connected with the buffer body 11, and holding metal sheet elements 47 and 48 which are weldedly connected with the vehicle wall 24, on the one hand, and with the armoring element 25, on the other hand. The metal sheet elements 47 and 48 are configured as semicircular disks. The floor metal sheet plates 45 and 46 are provided at their outer peripheries with radial projections 50 which are spaced at a predetermined angular distance from one another to form arresting contours. The radial projections 50 extend outwardly and over a predetermined circumferential angle. On the other hand, the holding metal sheet elements 47 and 48 are provided with similar radial inward projections 51 which angularly spaced at the same angular distance from one another; however, the projections 51 extend inwardly. Furthermore, adjustment rings 52 are rigidly connected with the floor metal sheet plates 45 and 46. The adjustment rings 52 extend radially beyond the floor metal sheet plates 45 and 46 and the buffer body 11 is received between the floor metal sheet plates 45 and 46. The rings 52 are provided at their outer peripheries with external teeth formations 53. These external teeth formations 53 render it possible to insert, without encountering any difficulties, a hook key or of another suitable tool, in order to turn the anchoring elements 10 in their entirety about an axis that extends perpendicularly to the plane defined by the major dimensions of the floor metal sheet plates 45 and 46. In this manner, the arresting contours can be brought into their coupling positions in which they engage one another, or to uncouple such arresting formations. In addition thereto, the anchoring element 10 which is illustrated in FIGS. 10 and 11 of the drawing is provided with the bow elements 16 and 17 which embrace one another with clearance, and are alternatingly connected by welded joints to two bottom metal sheet plates 45 and 46, as well as being embedded in the buffer element 11.

During the mounting or assembly of this anchoring element 10, the projections 50 which extend radially beyond the peripheries of the annularly configured floor metal sheet plates 45 and 46 are introduced into the gaps situated between the radially inwardly extending projections 51 of the holding sheet metal elements 47 and 48, and then the projections 50 and 51 of the floor metal sheet plates 45 and 46 and of the holding sheet metal elements 47 and 48, which serve as arresting contours, are brought into their holding positions in which they positively engage behind one another by a simple turning of the entire anchoring element 10. The coupling position is herein achieved simultaneously in the region of the two floor metal sheet plates 45 and 46. A particular advantage of this arrangement as compared to those described above is to be found in the fact that the arresting contours which in this particular construction of the arrangement of the present invention cooperate with one another in a bayonet-like fashion give the anchoring element a loadability in all directions that are parallel to the assembling plane.

Figure 12:
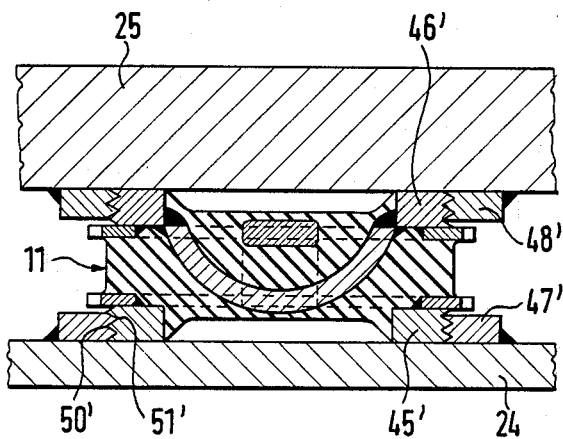
FIG. 12 is a view similar to FIG. 10 but showing yet another modification of the anchoring arrangement.

In the construction of the arrangement of the present invention that is depicted in FIG. 12 of the drawing, instead of using the rapid-coupling means that engage one another with a bayonet-like action, respective floor metal sheet plates 45= and 46= and respective holding metal sheet elements 47= and 48= which are connected by respective welded joints to the anchoring base 24 and to the armoring element 25, respectively, are constructed as cooperating helically threaded elements. The floor metal sheet plates 45= and 46=, which have circular annular plate-shaped configurations, are provided with externally threaded portions 50=, whereas corresponding internal threaded portions 51=, are cut into the corresponding bores of the respective holding metal sheet elements 47= and 48= which are connected by respective welded joints to the anchoring base 24 and to the armoring element 25, respectively. In all other respects, this modified construction of the arrangement of the present invention corresponds to and is operated in the same manner as that discussed above in conjunction with FIGS. 10 and 11 of the drawing.

Figure 13:
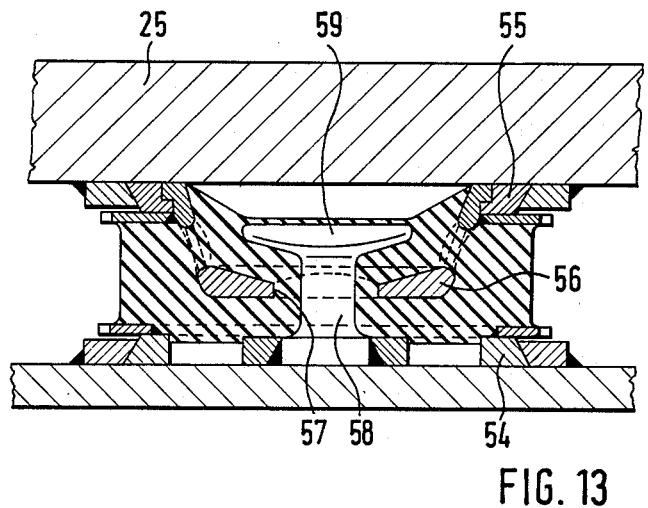
FIG. 13 is another view similar to FIG. 10 but showing another modification of the anchoring arrangement.

The construction of the arrangement of the present invention which is illustrated in FIG. 13 of the drawing differs from that described above in connection with FIGS. 10 and 11 of the drawing in that a holding cage 56 having a central opening 57 is rigidly connected with one floor metal sheet plate 55, while a pin 58 projects from another floor metal sheet plate 54 and penetrates through the aforementioned central opening 57 of the holding cage 56. The pin 58 is weldedly connected with the other floor metal sheet plate 54 and is provided at its end that is remote from the other floor metal sheet plate 54 with a disk 59 which engages behind the holding cage 56 next to the central opening 57. In this particular construction of the arrangement of the present invention, the central opening 57 of the holding cage 56 is configured as an elongated slot, and the disk 59 which is mounted on the free end portion of the pin 58 which is connected by a welded joint to the other floor metal sheet plate 54 has a hammerhead-shaped configuration and is so arranged that the longitudinal dimension of this elongated disk 59 extends transversely with respect to the elongation of the slot-shaped central opening 57 provided in the holding cage 56, so that the disk 59 positively engages the holding cage 56 at is side which faces away from the other floor metal sheet plate 54.

What is characteristic for the above-described constructions of the arrangement of the present invention, and what thus distinguishes the present invention from the prior art is that, due to the plate-shaped configuration of the buffer body having a thickness which is very small when compared with its major dimensions, and due to a similar configuration of the floor metal sheet plates made of a flat material and also having a thickness which is very small when compared with its major dimensions, there has been provided an anchoring element which, on the one hand, has a very small structural height and thus renders it possible to mount the anchoring arrangement for armoring elements or other relatively heavy plates at a very small distance from the anchoring basis and, on the other hand, assures participation of practically the entire buffer body in the desired resilient and damping action. In addition thereto, the anchoring element constructed in accordance with the present invention renders it possible, in view of the provision of the connecting components with rapid-coupling means in the form of positively cooperating wedge surfaces, to achieve a very simple mounting and dismounting operation and, consequently, the selective positioning of different armoring elements, for instance on the frame of an armored vehicle or in other arrangements.

While the present invention has been described and illustrated herein as embodied in a specific construction of an arrangement for anchoring armoring elements to a motor vehicle frame, it is not limited to the details of this particular construction, since various modifications and structural changes are possible and contemplated by the present invention. Thus, the scope of the present invention will be determined exclusively by the appended claims.

What is claimed is:

1. An anchoring element for the securing of heavy plates on an anchoring base, particularly for securing armoring elements additional armoring to vehicles, comprising
   a buffer body of a material that is elastically deformab to a limited extent, said buffer body having a plate-shaped configuration;
   two connecting elements rigidly connected with said buffer body and held by said buffer body at a predetermined distance from one another so as to be movable with respect to one another within limits determined by the deformability of said buffer body, each of said connecting elements is secured to a metal sheet plate having a thickness which is very small relative to its other dimensions, said pair of metal sheet plates accommodating said buffer body between themselves and being connected with the latter over relatively large areas; and
   means for securing one of said connecting elements to one of said sheet metal plates and the other one to the anchoring base;
   said buffer body and said metal sheet plates which are secured to said connecting elements have at least one aperture each for improving the elastic yieldability of said buffer body due to penetration of the material of said buffer body into said metal sheet plate aperture.

2. The anchoring element as defined in claim 1, wherein said aperture of said buffer body is substantially situated at a region of a contact plane in at least one of said floor metal sheet plates.

3. The anchoring element as defined in claim 1, and wherein each one of said connecting elements is in the form of a holding means embedded in said buffer body and rigidly alternatingly connected with an opposite one of said floor metal sheet plates of said connecting elements, said holding means including holding elements that extend behind one another with a predetermined play and permitting elastic deformation of said buffer body with predetermined limits.

4. The anchoring element as defined in claim 3, wherein said holding means includes at least one holding cage rigidly connected with one of said floor metal sheet plates, embedded in said buffer body, and having at least one opening, and at least one pin rigidly connected with the other through said opening of said holding cage and having a free end portion and a disk mounted on said free end portion of said stem and positively engaging said holding cage from behind at a side thereof which faces away from said other floor sheet metal element upon a predetermined compression of said buffer body.

5. The anchoring element as defined in claim 4, wherein said disk that is mounted on said free end portion of said stem of said pin which is rigidly connected with said other floor metal sheet plate has an elongated hammerhead-shaped configuration.

* * * * *